June 27, 1933.        C. F. DUTTON        1,915,653
EDUCATIONAL TEST APPLIANCE
Filed Dec. 27, 1929         5 Sheets-Sheet 1

1

9B  General  Science

1. Which is heavier:  (1) whole milk or (2) skimmed milk;
   (3) cream or (4) water; (5) skimmed
   milk or (6) water, (7) water or
   (8) whole milk?

2. Can the quality of milk be determined by weight?
   (1) yes.     (2) no.
   Color of milk is affected, (3) more, (4) less, b
   watering than by skimming 3. Yellow fever is transmitted by,
   (1) soiled clothes, (2)
   (3) mosquitoes.

4. Which is the quickest way to
   (1) Obse
   (3) e

5 Anything which has

6 Which o

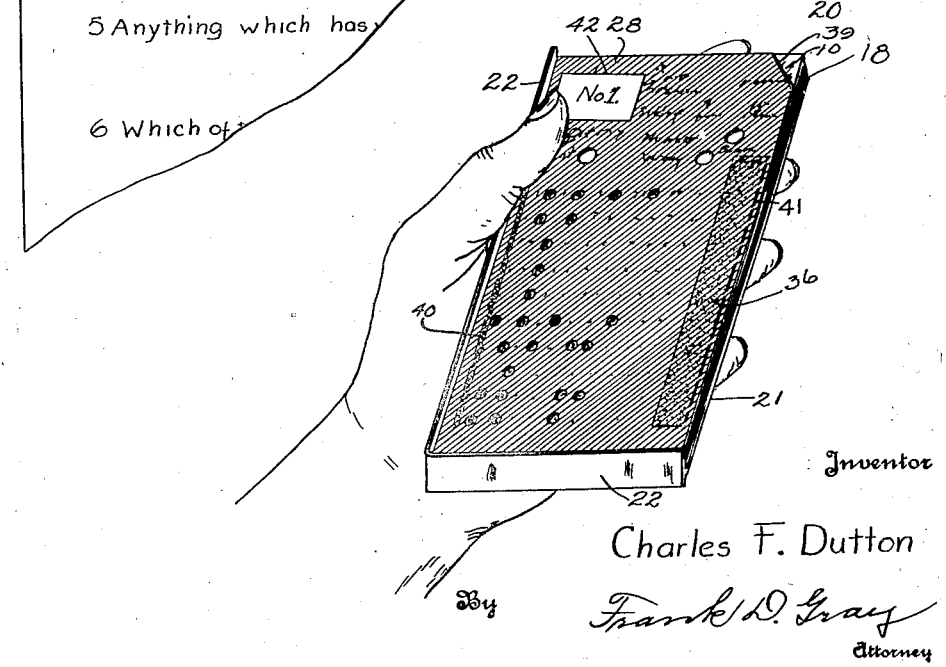

Inventor
Charles F. Dutton
By Frank D. Gray
Attorney

June 27, 1933.  C. F. DUTTON  1,915,653
EDUCATIONAL TEST APPLIANCE
Filed Dec. 27, 1929   5 Sheets-Sheet 2

Inventor
Charles F. Dutton
By Frank D. Gray
Attorney

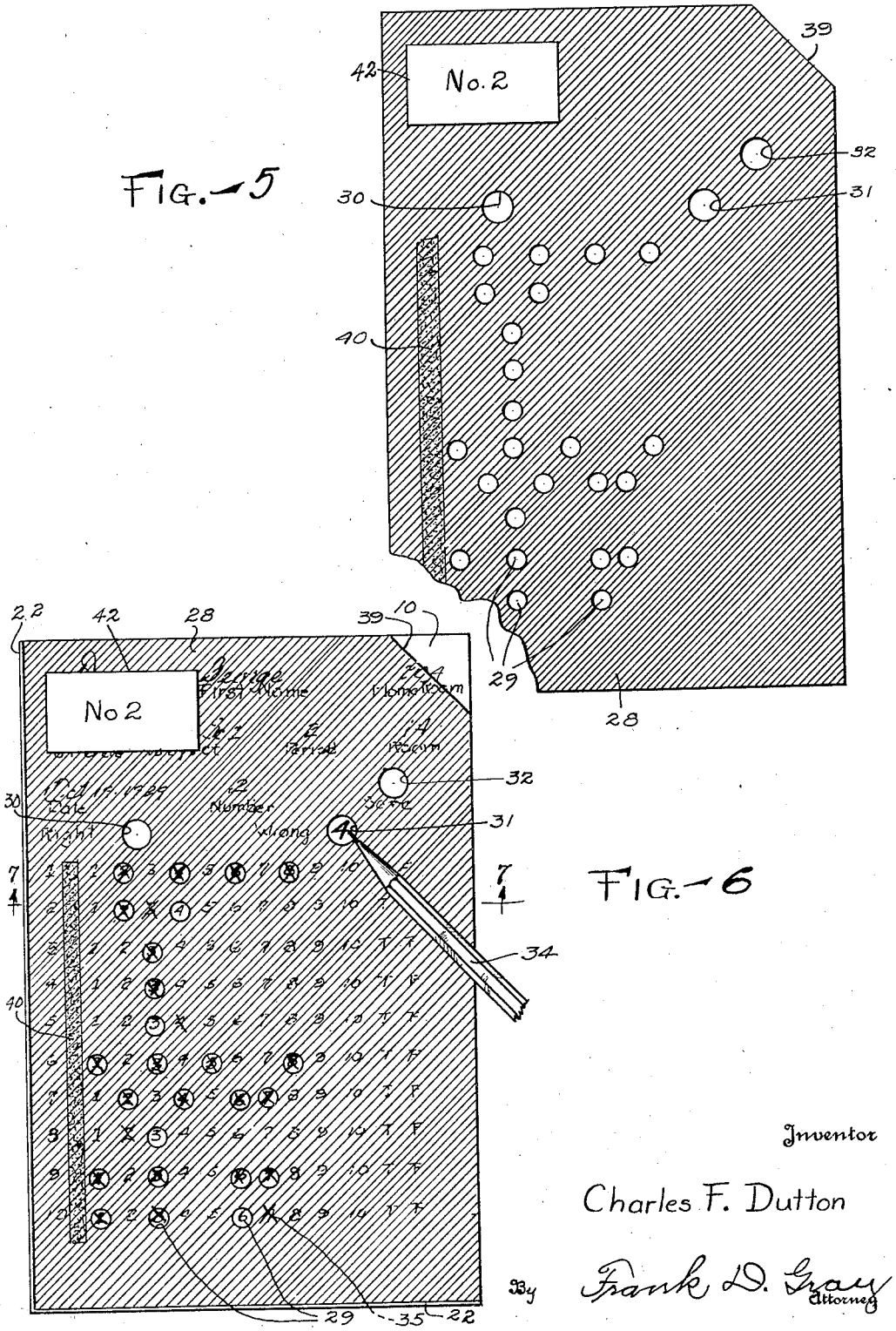

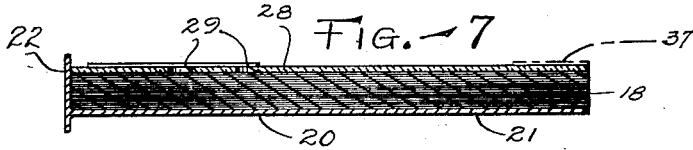
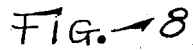
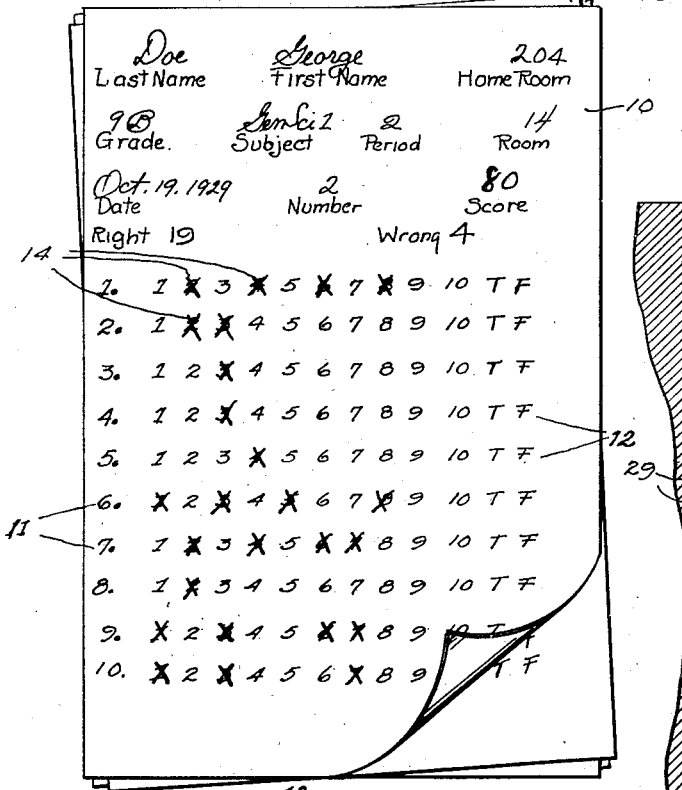
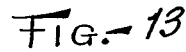
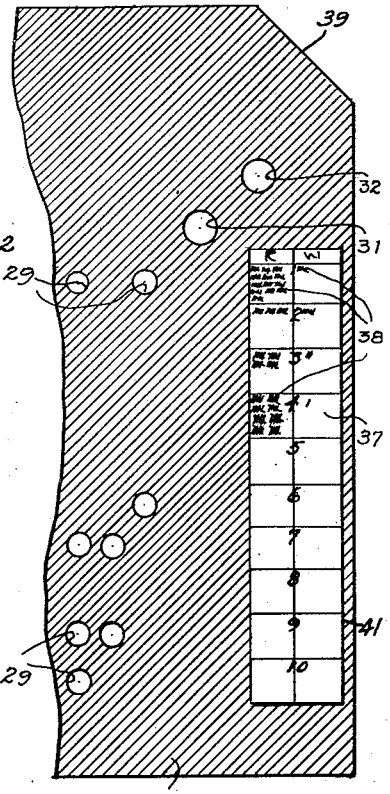
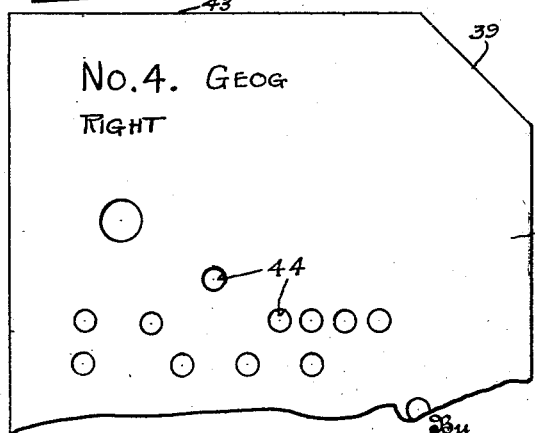

June 27, 1933.  C. F. DUTTON  1,915,653
EDUCATIONAL TEST APPLIANCE
Filed Dec. 27, 1929   5 Sheets-Sheet 5

Inventor
Charles F. Dutton
By Frank D. Gray
Attorney

Patented June 27, 1933

1,915,653

UNITED STATES PATENT OFFICE

CHARLES F. DUTTON, OF CLEVELAND, OHIO

EDUCATIONAL TEST APPLIANCE

Application filed December 27, 1929. Serial No. 416,861.

My invention relates to an educational test appliance especially adapted for correcting answers that have been made by the pupil to the questions of a test, such appliance being valuable in grading pupils' test sheets resulting from an examination. In taking the test the pupil marks upon a relatively small sheet identifying symbols originally appearing thereon, selectively, which correspond to certain identifying symbols which are adjacent certain alternate answers on a set of examination or test questions. The teacher then superposes the said small sheets bearing the sets of marked answers of the pupils taking the test and places a tinted but transparent sheet upon said marked answers, apertures in the sheet identifying clearly the correct marked answer, but the tinted material showing the other symbols as of a different shade. The teacher can mark the result of the pupil's answers, by operating a suitable device through certain apertures in the uppermost sheet, and check the total on the margin of the apertured sheet itself.

My invention further relates to suitable appliances that have been found especially adapted to their purpose when comprising a convenient and relatively small printed form sheet, preferably of light weight paper, bearing at the top margin identifying data as to the particular pupil, and if desired, his room number and a space for entering the number of the test now to be made, and other spaces for receiving the totals of the right or wrong answers, and the total score indicating the final result of this particular test. The lower portion of the forms will bear the printed symbols which the student marks as his selective answers; the tinted sheet may be a celluloid stencil of uniform size with said form sheet having suitable perforations properly positioned to show the accurate marked answers and larger apertures registering with the said spaces to permit marking therethrough with pencil; and the said stencil being of a much smaller size than the question sheet, if the latter is used, but of a size identical with the pupil's form sheet and adapted to be supported with the latter upon a rigid holder the latter having a thin but rigid support plate and a side and end flange, for receiving the superposed form sheets of all the pupils of a class of ordinary size, and having a size and outline well adapting it to holding the same readily in the hand, so that it can be readily carried by the teacher in one hand while he marks the forms with the other.

It is a special object of my invention to provide suitable data sheets, that may be termed form sheets, that will bear little significance to the casual observer, but which, because of the restriction thereof to identifying data and to identifying symbols only, and because they bear no detailed information either as question or answers, provide in very small space all the information the teacher will need for each pupil in a single test. Its condensed character is decidedly advantageous.

It is a further object of my invention that, whatever means for presenting the test questions is employed, no marks or checks are ever made on the original set of relatively large questions, either by the pupil or the teacher, so that the same question sheets, if the latter are used, may be employed a number of times, or even by different schools; and a related advantage results from such question sheets bearing no indication of the final marking of the smaller form sheets by the teacher; and further, the results of a test may be quickly known—both the individual pupil's score and the class score.

An added object of my mechanism resides in the fact that the several pupils' form sheets, so readily assembled in my rigid holder, show at once which questions are missed by many and those answered correctly by many, so that the work of the teacher as well as that of the pupil can be measured.

Together with other evident advantages, it is of especial value that the form sheets carried as indicated above in the holder in which they have been scored, make a package small enough to be carried in a man's side pocket or a woman's hand bag, and that, since no desk is required, the work can be done at odd moments when the teacher is either sitting or standing.

That the invention may be more fully understood, reference is had to the accompanying drawings forming a part of this application and illustrating certain preferred embodiments of the invention, in which—

Figure 1 is a perspective view of the flanged holder supporting the form sheets together with the tinted stencil, and shown grasped by the hand;

Figure 2 is a fragmentary plan view of a question sheet bearing the questions and parts of questions of a given test, together with alternative answers having adjacent symbols for each;

Figure 5 is a fragmentary plan view of a correction plate or stencil, tinted and suitably perforated for use with a particular set of symbols;

Figure 6 is a plan view of a stencil in position on a stack of form sheets, and supported on the holder while the teacher is marking a pupil's number of wrong answers on the sheet through an aperture in the stencil, the accurately marked symbols showing through apertures, and other symbols showing dimly or of a different shade through the tinted stencil;

Figure 7 is a transverse section of the stack and holder taken in the plane indicated by the line 7—7 of Fig. 6;

Figure 8 is a plan view of a form or answer sheet, after being marked by the teacher;

Figure 9 is a fragmentary plan view of a stencil sheet or card of opaque material, whose apertures will normally register with the accurate answer symbols of an answer sheet;

Figure 13 is a fragmentary plan view of a celluloid stencil showing adjacent the right hand margin, a roughened surface for receiving total score marks by the teacher.

It has long been a common practice to conduct tests of pupils of an entire class by exhibiting to them a series of questions or parts of questions having adjacent such questions a series of answers, some accurate and others inaccurate, from which the pupil selects those he believes to be accurate, by marking a cross on the test sheet, if a sheet is used. This manner has the disadvantage of requiring the use of a number of large sheets which for a class requires a large mass of manuscript.

A further disadvantage arose from former appliances including the large question sheets for receiving the pupils' answer marks, in that a teacher having the marked test papers of a number of pupils before him for careful study of the general progress of the entire class, required the use of a desk for supporting the manuscript, and the careful consideration of the marked question sheets and notations made on some other sheet or book, to compare the several scores. I have overcome these difficulties by providing relatively very small cards or form sheets 10, preferably on light weight paper, which bear the data for identifying the pupil, the date of the test, and the number of the test, if it is desired; and below such data no portion of the questions or answers, but only the symbols (which may be numbers or letters), by the selection of which the pupil's answer to the question is indicated.

Figure 3:
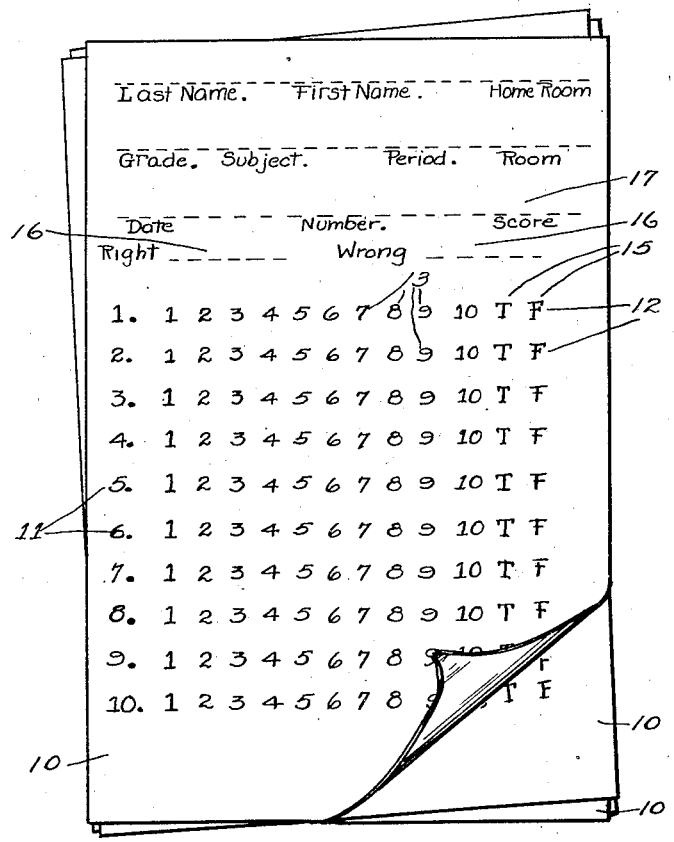
Figure 3 illustrates a plurality of superposed form sheets having the answers identified by numerals, but unmarked.

In Fig. 3, the form sheet 10 bears the ten numerals 11 adjacent the left hand edge, such numerals representing ten questions given in the test, and the horizontal rows 12 of numerals 13 representing alternate answers on the set of questions submitted having identical numerals. The pupil will mark with his pencil a cross on the numbers in these rows, while the questions with their accompanying answers and numbers are being exhibited to him, on a relatively large scale, as by a large sheet, the marked numbers 14 being shown in Fig. 4 of the drawings. The letters T and F arranged in rows 15 indicate symbols representing the words "true" or "false" for use when but one of two possible answers is to be marked. The number of "right" or "wrong" answers made by the pupil in the test may be marked on the form sheet at 16, usually by the teacher. The resulting score will finally be marked at 17 by the teacher. The marks at 16 and 17 are the only ones made by the teacher or his assistant. The others are made by the pupils.

The form sheets 10 which I propose to use, since they bear very little data other than identifying symbols such as single numerals or letters, can easily be superposed in a stack 18 of a size that may be readily held in the hand of the teacher, as shown in Fig. 1 of the drawings. For convenience in thus assembling the form sheets 10 in such a stack, I have provided a shallow holder 20, preferably of metal, comprising a flat bottom plate 21 with narrow vertical flanges 22 secured at one side and one end to said plate which latter will have the size identical with the form sheets 10 which it is desired to use.

Such a holder 20 may be made to hold the marked form sheets 10 of all the pupils of an ordinary class, whereby this stack will represent to the teacher the result of the test that has been given his class, and enables the teacher to critically consider such results by means of this holder, whether the teacher is sitting or standing. This advantage of assembling the data of so many pupils in one small stack 18, arises from the fact that the questions together with their answers written out or otherwise shown in printed characters are originally exhibited on larger and separate sheets or other surfaces, in a much larger area, as in the general arangement indicated on the printed sheet 23 shown in Fig. 2, on which symbols 24 represent the alternate answers, and only such symbols being shown on the relatively small form sheet 10.

Figure 4:
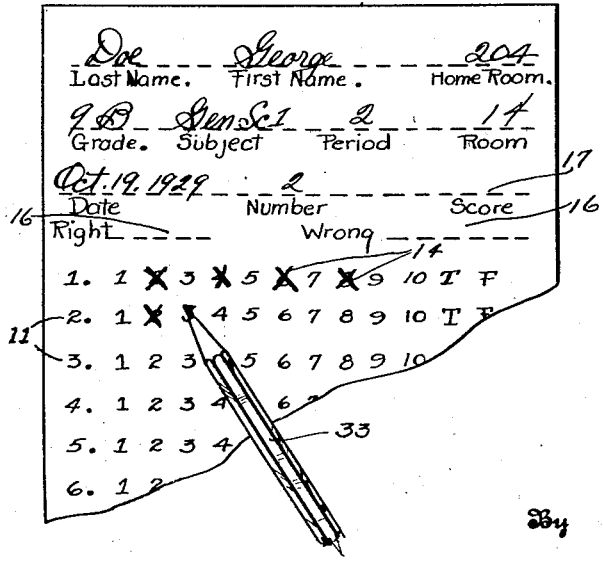
Figure 4 is a fragmentary plan view of a form or answer sheet as it is being marked by the pupil.

It is to be understood at this point, that the symbols 11, 13 and 14, as they appear in Fig. 4 of the drawings, are intended to identify the various answers or parts of answers having the corresponding symbols 24 associated therewith on Fig. 2 of the drawings. The use of my appliances therefore, permits a single question sheet 23 for each pupil, to exhibit the questions, answers and symbols to an entire class of pupils, or at least to a large number of pupils. Although this is true, the symbols only, may readily be shown upon the relatively small form sheets 10, without unduly crowding all of the symbols thereon as shown in Figs. 1, 3, 4, 8 and 11.

The form sheets 10, after being marked by the pupil as shown in Fig. 4, can, by using my appliances, be stacked in superposed relation, as shown in Figs. 1, 3, 7, 8, 11 and 12, after which a flexible, thin stencil 28 of the exact size of the holder 20 may be applied to the upper of the stacked forms 10, which will result in the apertures 29 registering with the symbols which correspond to the correct answers on the question sheet 23 or other disclosure that may be used as its equivalent. The said stencil 28 has in its upper portion larger openings 30 and 31 through which a pencil may mark the number of right and wrong answers made by the pupil, respectively, upon the uppermost form 10. Another larger aperture 32 will also permit marking through the stencil the resulting score upon the sheet 10 in the same manner.

In Fig. 4 of the drawings, the pencil 33 is seen marking the selected symbols 13 directly upon the form sheet 10, prior to the use of the stencil 28 for later determining the accuracy of the pupil in marking the symbols on such sheet, while in Fig. 6 is seen the pencil 34 used by the teacher or his assistant, marking the blanks 16 and 17 through the apertures 30, 31 and 32.

It is a special and novel discovery that I have made, as one of the features of my invention, that it is highly advantageous to use a stencil of flexible and transparent material that will permit showing of symbols 35, which do not correspond to correct answers, on the pupil's form sheet 10, and through the imperforate portions of the stencil 28, because of the transparent character of such material, at the same time that the correct symbols appear clearly through the apertures 29, though it will be evident that such symbols 35 will appear to the observer somewhat different, from the correct symbols that appear through the apertures 29 of the stencil. This feature results in the highly valuable effect of enabling the teacher to observe all of the symbols through the stencil at one time, though the correctly marked symbols will appear somewhat clearer than the wrongly marked ones.

It is also a further purpose that I have found highly advantageous in using my stencil in the use of my appliances, which consists in providing on certain upper surfaces or portions thereof, an area of such character that may receive pencil marks thereon, as for the purpose of indicating thereon check marks to indicate the number of right and of wrong answers, that the total number of pupils examined at one time, as the total pupils of a class, may have made for a single question. This plan is clearly feasible for the reason that each separate, marked sheet 10 may be placed, after checking, at the bottom of the stack immediately above the plate 21, after which the several sheets 10 will be marked by the teacher on such checking surface, as shown at 36 in Fig. 1, or at 37 in Fig. 13. These limited surfaces may be made to appear upon various of the flexible and transparent stencils that are to be employed in the use of my appliances.

It is specified that the stencils 28, shown in Figs. 1, 2, 5, 6, 7 and 13 are ordinarily provided of thin material, and that it will usually be desirably flexible. Further, the corner farthest from the flanges 22 of the form when mounted thereon, will be severed obliquely, as shown at 39, to make ready separation therefrom of form sheets 10 underneath. A number of materials have been considered and may be used for these stencils 28, among which the compound cellulose nitrate might be used, but is not preferred because of its explosive character. However, cellulose acetate answers the purpose of my thin stencil shown in the above recited views, and I have discovered that it is especially adaptable for the use which I have described.

Some of these cellulose compounds, including certain related materials not specifically recited herein, are especially serviceable as transparent stencils by the use of which, though not positively tinted by a special dye, serve to give a somewhat different appearance to symbols on the form sheet 10 which show through the imperforate portions of the stencil from those that show through the perforations of the stencil, as will be evident.

I have found it highly desirable, however, to manufacture these only very slightly translucent stencils 28 of some of the cellulose or similar compounds, and at the same time dyeing the material with a suitable dye substance to provide a final stencil of a tinted material. A number of shades for this purpose are available, among which are pink, amber or red by the use of which the symbols on the sheets 10 appearing through the stencil material will contrast very decidedly with those shown through the perforations 29. In the above mentioned views, the stencils are shown lined to indicate "red", though either pink or amber have been found very serviceable, as well as others.

An elongated surface 41 may well appear along one lateral edge of the stencil 28 which surface may be treated to render it suitable to receive thereon check marks as shown at 38 which will enable the teacher or supervisor to summarize the result of a given test for a large group of pupils, as of a class. This surface 41 is shown in Fig. 1 as having been subjected to an abrasive treatment, a light grinding operation, or to a scouring or sanding action upon the surface itself; while this surface 41 is shown at 37 as having a narrow strip or tape of different material which is adaptable to receive the check marks 38. In the use of such surfaces near a marginal edge of the stencil 28, a provision is made for checking results the teacher has attained by observation of the several form sheets 10 while the latter are covered by the stencils which permit observation of the marked symbols as well as those unmarked, in such relation.

It has also been desirable to give certain questions and their related answers, in checking, greater weight in finally arriving at the score for each pupil and for a given test. I have therefore, provided for this purpose, another roughened or scarified surface 40 nearer the margin of the stencil opposite from the surface 41, this opposite surface 40 will be relatively narrow, and may receive thereon the desired numeral to indicate the coefficient representing the relative value of the several questions. This is possible and especially advantageous because the form sheets 10 have so relatively small area.

A suitable label 42 may be readily attached though removably, to the given stencil 28 to indicate the test for which the given stencil is provided. It is to be understood that the perforations 30, 31, and 32 are the only ones that will be used for penciling therethrough upon the sheets 10 underneath. The other perforations will only be used for observation while the form sheets and stencil are stacked in the holder 20 and usually carried in the hand, as in Fig. 1.

Figure 10:
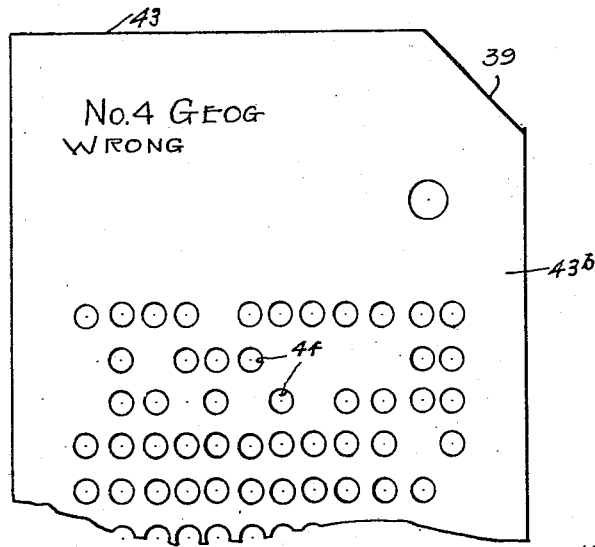
Figure 10 is a fragmentary plan view of a stencil sheet or card, whose apertures will normally register with the wrong answer symbols of an answer sheet.

While the specific surfaces 36 and 37 are well shown in Figs. 1 and 13, it is not to be considered as limited to the application there shown, but that either of such showings may represent accurately the application of such treated surfaces on either of the stencils 28 shown in Figs. 5, 6 and 7 as well. In Figs. 9 and 10 I have illustrated another adaptation of stencil generic to the form thus far described. These stencils 43 are manufactured from material that may be a paper product, but they will, in any case, have the perforations for the use intended. In stencil 43a shown in Fig. 9, the perforations 44 will register with the symbols of the form sheet 10 which indicate the correct answers to the given questions, while in stencil 43b shown in Fig. 10, the perforations will register with the symbols of the form sheet 10 which indicate the incorrect answers to such questions. Either stencil may be used and separately.

Figure 11:
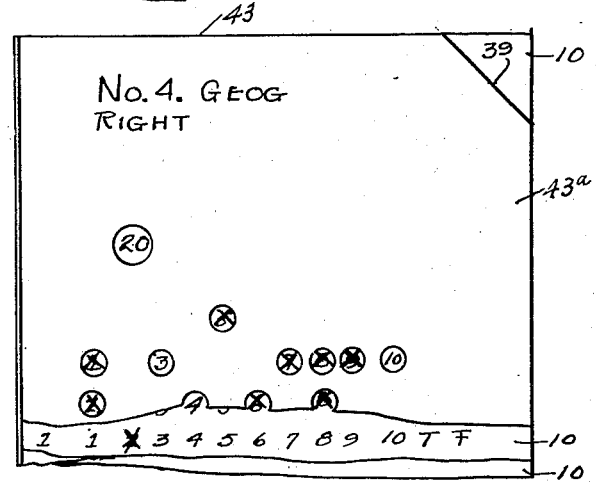
Figure 11 is a fragmentary plan view of a stencil for right answers shown in place on the holder.
Figure 12:
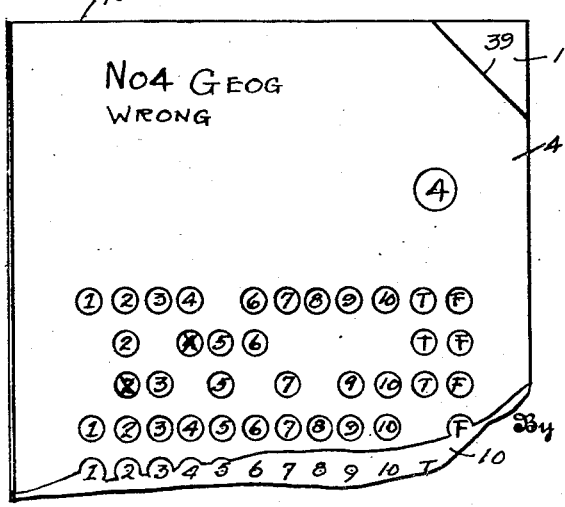
Figure 12 is a fragmentary plan view of a stencil for wrong answers shown in place on the holder.

In Fig. 11 of the drawings, I have shown an incomplete stack of marked form sheets 10 with the stencil 43a superposed thereon. Fig. 12 also shows an incomplete stack of marked form sheets 10 applied in the holder 20 and with the stencil 43b thereupon. This stencil 43b may be made to show through its perforations the unmarked as well as the incorrectly marked symbols, as will be evident. These stencils may be used in connection with the stack of sheets 10 and the holder 20, but will not, of course, show all the symbols therethrough by the use of a single given stencil.

The results made by a pupil who has marked a form sheet, may be observed and the score checked by using the stencils 28 or 43, and comparisons made both between pupils and between teachers conducting a given test.

*Operation.*—In using my appliances, it is desirable to present a set of test questions with alternative answers and accompanying symbols to the pupil in any suitable form, as by showing to each pupil by a relatively large test sheet such matter, it being only desirable that the smaller form sheets 10, a copy of which is given each pupil and which bears the corresponding symbols only, shall be relatively small in size so that they may be readily stacked in the holder 20 which the teacher can hold in his hand, the size of the showing of questions, answers and symbols being desirably as large as convenient for observation by the pupil, and the question sheets never being marked on by anyone. My improved devices may be made especially useful by the marking of the selected symbols on the several form sheets by the pupil, thereafter stacking the several sheets 10 in the form 20 held in the hand, applying the stencil 28 or 43 on such stack in the form, and observing the symbols showing through the stencil perforations. If stencils 28 are used, all the symbols of the sheets 10 are observed on one sheet at a time, and on the surface 41 of the stencil a check 38 is made indicating the number of right answers and wrong answers, and the number of unmarked answers is noted, while at the same time due weight is given to the coefficient that may be indicated on the surface 40. All the checking by the pupils taking the test is done on the form sheets 10, and the question sheets are used over and over for subsequent tests.

While description of means of presenting the questions to the pupils is explained by reference to the use of a relatively large sheet, such as 23, any means practicable for so exhibiting these questions with associated answers and symbols is to be taken as within the purview of this specification. It is also to be understood that the recited "tinted" transparent stencils 28, may be of any color, the three colors—amber, pink and red being only suggestive.

Having thus described my invention, what I claim, and desire to procure by Letters Patent, is—

1. A flexible stencil member of thin transparent tinted material having spaced apertures arranged in relative position therein corresponding to the symbols in an educational test sheet underneath said member whereby to identify the correct answers of a test, certain other apertures being adapted to permit insertion of a pencil therethrough to marked desired data on said sheet, and said member also having a narrow scarified surface strip adjacent one edge thereof for receiving indicia expressing certain relation of data appearing in said apertures.

2. A flexible apertured stencil member of transparent tinted material whose apertures are arranged in suitable relative position in the stencil to correspond to certain of a plurality of symbols appearing on an educational test sheet to indicate test answers, the other of said symbols showing dimly through the imperforate material, whereby the symbols on the test sheet appearing through the apertures may indicate answers of different character from those showing through the tinted material.

3. A flexible apertured stencil member of transparent tinted material whose apertures are of similar outline and permit insertion of a device to mark data of an educational test upon a test sheet underneath said member, certain of said apertures being arranged in suitable relative position in the stencil to correspond to certain of a plurality of symbols on said sheet, the other of said symbols showing dimly through the imperforate material, whereby the symbols on the test sheet appearing through the apertures may indicate answers of different character from those showing through the tinted material, and said member having a roughened surface portion for receiving summarized totals of said answers.

4. The combination of a form sheet bearing identifying symbols, and a stencil member of apertured transparent and tinted material through which said identifying symbols appear and whose apertures correspond in relative position to certain of the identifying symbols on said form sheet, and the remaining symbols appear through the imperforate portion of the stencil of tinted material but appear of different shade from those seen through the apertures.

In witness whereof, I have hereunto set my hand this twenty-third day of December, 1929.

CHARLES F. DUTTON.